United States Patent
Lang et al.

(10) Patent No.: US 9,574,337 B1
(45) Date of Patent: Feb. 21, 2017

(54) FLOW CONTROL METHODS AND DEVICES

(71) Applicant: Lane Enterprises, Inc., Camp Hill, PA (US)

(72) Inventors: Timothy Joel Lang, Forest Hill, MD (US); Patrick X. Collings, Mechanicsburg, PA (US); Douglas K. Graham, Carlisle, PA (US)

(73) Assignee: Lane Enterprises, Inc., Camp Hill, PA (US)

( * ) Notice: Subject to any disclaimer, the term of this patent is extended or adjusted under 35 U.S.C. 154(b) by 356 days.

(21) Appl. No.: 13/961,955

(22) Filed: Aug. 8, 2013

Related U.S. Application Data

(60) Provisional application No. 61/709,484, filed on Oct. 4, 2012, provisional application No. 61/724,033, filed on Nov. 8, 2012.

(51) Int. Cl.
*F16K 17/42* (2006.01)
*E03F 1/00* (2006.01)
*B01D 21/24* (2006.01)

(52) U.S. Cl.
CPC ............ *E03F 1/00* (2013.01); *B01D 21/2433* (2013.01); *B01D 21/2444* (2013.01); *Y10T 137/7319* (2015.04); *Y10T 137/7323* (2015.04)

(58) Field of Classification Search
CPC . B01D 21/34; B01D 21/2433; B01D 21/2444; E03F 5/105; E02B 15/106; Y10T 137/2795; Y10T 137/7319; Y10T 137/7323
USPC .................... 137/135, 397, 398; 405/96, 127
See application file for complete search history.

(56) References Cited

U.S. PATENT DOCUMENTS

| | | | | |
|---|---|---|---|---|
| 306,523 | A | * 10/1884 | Read | E03D 1/16 137/135 |
| 403,919 | A | * 5/1889 | Prince et al. | F22B 37/54 122/389 |
| 706,526 | A | 8/1902 | Carlisle | |
| 716,483 | A | * 12/1902 | Ryan | E02B 9/00 137/135 |
| 1,579,917 | A | * 4/1926 | Deming | F04B 53/1037 210/242.1 |
| 2,858,843 | A | * 11/1958 | Muller | F16K 31/22 137/172 |
| 3,498,465 | A | * 3/1970 | Fechter | B01D 21/18 210/525 |

(Continued)

FOREIGN PATENT DOCUMENTS

| | | | |
|---|---|---|---|
| JP | 56089615 A | * | 7/1981 |
| JP | 59233010 A | * | 12/1984 |
| JP | 603314 | | 1/1985 |

OTHER PUBLICATIONS

United States Patent and Trademark Office, Translation of Water Intake Device for JP59233010A, Dec. 2015, All pages.*

(Continued)

*Primary Examiner* — Craig J Price
(74) *Attorney, Agent, or Firm* — Hooker & Habib, P.C.

(57) ABSTRACT

A method for delaying the maximum rate of discharge of water from a stormwater retention basin includes varying the vertical distance of an intake opening from the waterline inversely with water depth. A flow control device for carrying out the method includes an intake pipe with an intake opening that is pivotally mounted to a float body, the pivot being spaced from the intake opening.

19 Claims, 8 Drawing Sheets

(56) References Cited

U.S. PATENT DOCUMENTS

| | | | | |
|---|---|---|---|---|
| 3,633,218 A * | 1/1972 | Lekberg | ................. | E03D 5/016 137/578 |
| 3,702,134 A * | 11/1972 | Henning, Jr. et al. | ................. | E02B 15/106 210/242.3 |
| 3,757,953 A * | 9/1973 | Sky-Eagle, Jr. | ................. | E02B 15/048 210/242.1 |
| 3,928,202 A * | 12/1975 | Raubenheimer | ................. | E02B 15/106 15/1.7 |
| 4,015,629 A | 4/1977 | Morgan et al. | | |
| 4,179,379 A * | 12/1979 | Mitchell | ................. | B01D 29/009 210/242.1 |
| 4,224,156 A | 9/1980 | Pardikes et al. | | |
| 4,290,887 A * | 9/1981 | Brown | ................. | B01D 21/2444 210/242.1 |
| 4,305,426 A * | 12/1981 | Scheid | ................. | E03F 5/107 137/101.29 |
| 4,431,536 A * | 2/1984 | Thompson | ................. | B01D 21/2433 210/123 |
| 4,647,374 A * | 3/1987 | Ziaylek | ................. | B01D 35/05 210/242.1 |
| 4,648,967 A * | 3/1987 | Calltharp | ................. | B01D 21/00 210/136 |
| 4,693,821 A * | 9/1987 | Goronszy | ................. | B01D 21/2433 137/578 |
| 4,865,734 A * | 9/1989 | Schulz | ................. | B01D 21/0012 210/205 |
| 4,956,100 A * | 9/1990 | Mikkleson | ................. | B01D 19/02 210/122 |
| 5,004,536 A * | 4/1991 | Geisler | ................. | B01D 21/2444 137/512 |
| 5,021,161 A * | 6/1991 | Calltharp | ................. | C02F 3/006 210/614 |
| 5,036,882 A * | 8/1991 | Norcross | ................. | B01D 17/0214 137/536 |
| 5,052,855 A * | 10/1991 | Chapman | ................. | E02B 13/00 210/242.1 |
| 5,113,889 A * | 5/1992 | McGuire, Jr. | ................. | E02B 9/04 137/135 |
| 5,232,307 A | 8/1993 | Nouri | | |
| 5,279,728 A * | 1/1994 | Weiss | ................. | E04H 4/1254 210/167.2 |
| 5,290,434 A * | 3/1994 | Richard | ................. | B01D 21/2444 137/398 |
| 5,358,644 A * | 10/1994 | Dennis | ................. | B01D 21/2444 137/398 |
| 5,421,995 A * | 6/1995 | Norcross | ................. | B01D 21/30 210/242.1 |
| 5,820,751 A | 10/1998 | Faircloth, Jr. | | |
| 6,383,389 B1 * | 5/2002 | Pilgram | ................. | C02F 3/006 210/110 |
| 6,406,617 B1 * | 6/2002 | Brauchli | ................. | B01D 21/2416 210/122 |
| 6,488,841 B2 * | 12/2002 | Glasgow | ................. | B01D 17/0214 210/122 |
| 6,997,644 B2 | 2/2006 | Fleeger | | |
| 7,052,206 B1 | 5/2006 | Mastromonaco | | |
| 7,125,200 B1 | 10/2006 | Fulton | | |
| 7,341,670 B2 | 3/2008 | Ghalib | | |
| 7,344,644 B2 * | 3/2008 | Haudenschild | ................. | B09C 1/002 210/151 |
| 7,459,090 B1 | 12/2008 | Collings | | |
| 7,762,741 B1 | 7/2010 | Moody | | |
| 7,790,023 B1 | 9/2010 | Mills | | |
| 7,794,589 B2 * | 9/2010 | Kozey | ................. | B01D 35/05 210/122 |
| 7,871,516 B2 * | 1/2011 | Hoefken | ................. | B01D 21/2444 210/242.1 |
| 7,985,035 B2 | 7/2011 | Moody | | |
| 8,021,543 B2 | 9/2011 | Ghalib | | |
| 8,043,026 B2 | 10/2011 | Moody | | |
| 8,871,202 B2 * | 10/2014 | Sabbadini | ................. | C07K 16/18 424/130.1 |
| 9,051,701 B2 * | 6/2015 | Westcott | ................. | E02B 8/00 |
| 2001/0013489 A1 | 8/2001 | Williamson | | |
| 2004/0168967 A1 * | 9/2004 | Thompson | ................. | B01D 17/0211 210/242.1 |
| 2009/0236278 A1 * | 9/2009 | Hoefken | ................. | B01D 21/2444 210/237 |
| 2010/0065508 A1 * | 3/2010 | Bolan | ................. | B01D 35/05 210/747.6 |
| 2010/0284746 A1 | 11/2010 | Moody | | |
| 2011/0176869 A1 | 7/2011 | Moody | | |

OTHER PUBLICATIONS

English-language translation of specification and claims of JP 603314 (3 pages).

* cited by examiner

FLOW CONTROL METHODS AND DEVICES

FIELD OF THE DISCLOSURE

This disclosure relates to regulating the flow of water draining from or otherwise discharged from a natural or man-made stormwater storage area such as a stormwater retention basin, sedimentation pond or sedimentation basin, or the like.

BACKGROUND OF THE DISCLOSURE

Stormwater retention basins store water accumulated during a rain event and release the water at a controlled rate to prevent or limit downstream flooding and/or limit downstream waterway erosion.

Sedimentation ponds and sedimentation basins (hereinafter referred to as sedimentation basins) are designed to trap stormwater sediment within the boundaries of a property and prevent the sediment from flowing into downstream waterways. However, sedimentation basins are also often also used to meter the flow of stormwater to downstream waterways, thereby reducing the potential for flooding and downstream erosion.

Some basins have a discharge opening or orifice with a fixed cross sectional flow area located near the bottom of the basin. As the water level in the basin increases during a storm event, the rate of water discharged from the basin (which is essentially proportional to the square root of the water depth) increases with water level. Because the basin may fill quickly during a storm event, water is discharged from the basin at a maximum rate when the basin is at its most full condition (which is normally soon after the storm event has occurred).

Stormwater events often cause downstream flooding and also scour sediment from the bottom and sides of waterways. The greater the flow of water, the worse the problem becomes downstream. Site development, which tends to include impermeable surfaces such as parking lots, roofs, and the like, normally acts to increase the rate of site discharge and contributes to downstream flooding and erosion problems.

Typically, all of the sources of stormwater for a given waterway are discharging at their maximum rates during or shortly after a rain event. These sources include underground and aboveground stormwater storage systems, conventional stormwater collection systems, and also overland flows (sheet flows). Given that site development increases the potential for downstream flooding and stormwater volume related problems, it is often advantageous to postpone or delay the onset of the maximum rate of discharge from a basin after the storm event, or to limit the maximum rate of discharge from the basin after a storm event.

Faircloth, Jr. U.S. Pat. No. 5,820,751 discloses a device that maintains a drain inlet orifice at a constant distance below the water surface of a basin despite raising or lowering of the water level in the basin. Because the inlet orifice is maintained at a constant distance below the surface, the water flows into the orifice at essentially a constant flow rate that is also essentially independent of the basin's water level. Even after the basin fills with water during a storm event, water discharges at that constant flow rate. This can be advantageous because it eliminates the early peak flows from the basin and protects downstream waterways from those peaks. This is especially important in that the peak flows from the various sources which contribute to the flow of a given waterway normally are all releasing at their maximum rate at the same time.

Even with a constant flow device controlling one or more sources, downstream waterways will still be subjected to maximal flows from sources that are not volume/rate controlled. These sources may include conventional stormwater collection systems and normal flows across natural surfaces leading to the streams and rivers.

There is a need, therefore, to delay the peak flows from a basin until preferably well after the rain event. The basin would preferably release water at a relatively lower rate early in a storm event near the start of the basin discharge period, and would discharge a relatively higher rate (including the maximum rate) more towards the end of the basin discharge period.

SUMMARY OF THE DISCLOSURE

Disclosed are embodiments of a method for delaying the peak flows from a stormwater storage area until preferably well after the rain event, and of a device for carrying out the method.

An embodiment of a method for regulating the discharge of water from a stormwater storage area having a waterline defining the depth of stormwater in the storage area from an initial first water depth to a lower, second water depth includes positioning an intake opening configured to receive water to be discharged from the storage area below the waterline and in communication with the water in the storage area when the water depth is the first water depth. The intake opening is positioned a first vertical distance below the waterline.

The intake opening is repositioned relative to the waterline as the water level in the storage area falls from the first water depth to the second water depth, with the vertical distance of the intake opening from the waterline varying inversely with water depth, as the intake pipe pivots with respect to the outlet pipe through an angle which may exceed 45 degrees.

The distance of the intake opening below the waterline is inversely related to water depth. The intake opening is located relatively nearest to the water line when the water depth is high, and moves further and further away from the water line as the water depth decreases. As the water level decreases from the first level to the second level, the hydraulic head above the intake opening increases, increasing the discharge rate in inverse relation to water depth. The discharge rate is lowest when the water level is at the first level and the maximum discharge rate is delayed until the water level has fallen to the second level.

A disclosed embodiment of a flow control device includes a inlet orifice that receives water into the flow control device and a vertical displacement system adapted to reposition the inlet orifice a distance below the waterline in inverse relationship to the water depth.

In a preferred embodiment of the flow control device, the inlet orifice is formed as an open end of an intake pipe. The vertical displacement system includes a pivotal connection between the other end of the intake pipe and an outlet pipe. A float attached to the intake pipe floats in the water and causes the intake pipe to pivot with respect to the outlet pipe with changes in water depth.

The float is connected to an attachment location of the inlet pipe, the attachment location spaced away from the intake opening. Pivotal movement of the intake pipe causes the vertical distance between the intake opening and the waterline to vary inversely with water depth.

The flow control device can be attached to a horizontal outlet pipe. The intake pipe may pivot 45 degrees with respect to the horizontal from a raised position when the water depth is the first water depth to a horizontal position parallel with the outlet pipe when the water depth has fallen to the second water depth.

Other objects and features of the disclosure will become apparent as the description proceeds, especially when taken in conjunction with the accompanying drawing sheets.

DETAILED DESCRIPTION

A method for regulating the discharge of water from a stormwater storage area having a waterline defining the depth of the storage area from an initial first water depth includes changing the hydraulic head of an intake opening below the waterline that receives the water to be discharged inversely with changes in water depth while the water level decreases to a lower second water depth. As the water depth decreases, the distance of the intake opening below the water line increases, thereby increasing the hydraulic head at the intake opening.

The increase in hydraulic head increases the rate of discharge inversely with the water depth. The maximum rate of discharge occurs when the water level reaches the lower, second water depth—thereby delaying the maximum discharge from the stormwater storage area until after a rain event has filled the storage area to the first water level.

Figure 1:
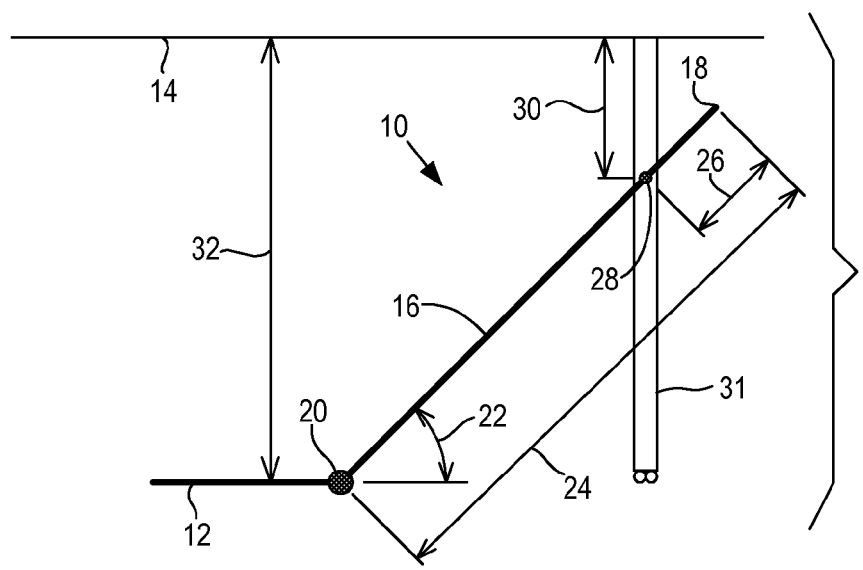
FIG. 1 illustrates in simplified form a portion of a flow control device 10.

FIG. 1 illustrates in simplified form a portion of a flow control device 10 for carrying out an embodiment of the disclosed method. The flow control device 10 is connected to the intake end of a fixed horizontal outlet pipe 12 that drains a stormwater retention basin, the basin having a waterline 14 spaced above the outlet pipe 12. The flow control device 10 includes an elongate intake pipe 16 having an intake or inlet orifice 18 that receives water into the intake pipe 16.

The illustrated inlet orifice 18 is formed by the open free end of the intake pipe 16. The illustrated intake pipe 16 is a straight length of pipe that extends from the free end 18 to a lower pipe end pivotally connected to a pivot connection 20 of the device 10 that interconnects the outlet pipe 12 and the intake pipe 16.

In other possible embodiments, the inlet orifice 18 could be a different diameter than the intake pipe 16. For example, the inlet orifice 18 could have a smaller diameter to form a flow restriction that reduces the rate of flow into the intake pipe to allow for a longer drawdown period.

The pivot connection 20 allows the intake pipe 16 to pivot (that is, to angularly displace) with respect to the fixed outlet pipe 12. The illustrated intake pipe 16 can pivot with respect to the outlet pipe 12 between a first, horizontal position in which the intake pipe 16 is substantially parallel with the outlet pipe 12 to a second position shown in FIG. 1 in which the intake pipe 16 has pivoted towards the waterline 45 degrees from the horizontal. The instantaneous angular position of the intake pipe 16 is the angle • represented by the arc 22.

The intake pipe 16 has a length L represented by the line dimension 24. Spaced along the intake pipe 16 a distance l represented by the line dimension 26 away from the inlet orifice 18 is a reference point 28 represented by the enlarged point 28 shown in FIG. 1. As will be described in further detail below, the intake pipe reference point 28 is maintained a substantially constant vertical distance P (represented by the line dimension 30) below the waterline 14 by a mounting structure 31 represented schematically in FIG. 1 while the basin water depth D represented by line dimension 32 is equal to or greater than P.

The waterline 14 shown in FIG. 1 represents the basin waterline immediately before the basin reaches an overspill condition. The basin water depth 32 is the maximum basin water depth and the intake pipe 16 is shown displaced an angle •=45 degrees from the horizontal. As the basin water level drops, the intake pipe 16 pivots away from the waterline 14 towards its horizontal position and the intake pipe angle • decreases with decreasing water depth. When the water depth 32 is equal to P, the intake pipe 16 is horizontal with the drain pipe 12 (that is, •=0 degrees).

Figure 2:
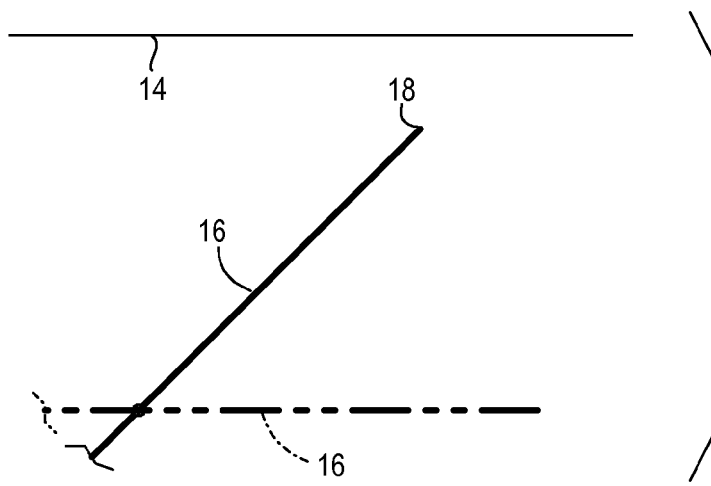
FIG. 2 is an enlarged view of the flow control device 10 illustrating movement of the inlet orifice with respect to the waterline.

FIG. 2 illustrates the relative position of the inlet orifice 18 of the intake pipe 16 with respect to the water line when the basin water depth is the maximum water depth (in which the intake pipe 16 is shown as a solid line) and when the water depth has dropped to a depth P (in which the intake pipe 16 is shown as a phantom line). Any horizontal translation of the intake pipe 16 is ignored since horizontal pipe displacement essentially does not affect how far the inlet orifice 18 is below the waterline 14.

When the water depth 14 is at its maximum and the intake pipe angle •=45 degrees, the inlet orifice 18 is spaced a first distance $H_{MIN}$ below the waterline 14. When the water depth 34 drops to P and the intake pipe angle •=0 degrees, the inlet orifice 18 is spaced a second distance $H_{MAX}$ below the waterline 14. As can be seen in FIG. 2, $H_{MAX} > H_{MIN}$ and $H_{MAX} = P$ (because the intake pipe 16 is parallel with the water line 14).

Inspection of FIG. 2 and application of elementary geometry finds the relationship between the hydraulic head H at the inlet orifice (that is, the depth H of the inlet orifice 18 below the waterline 14) is:

$H = P - l \sin •$ and so for the illustrated flow control device 10:

$H_{MIN} = P - l \sin(45 \text{ degrees})$, and $H_{MAX} = P$

Figure 3:
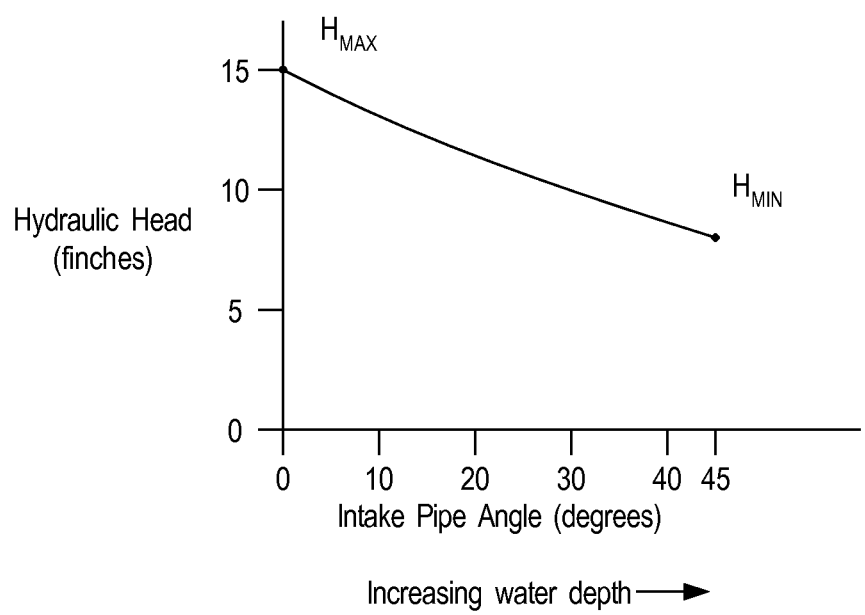
FIG. 3 is a chart of hydraulic head as a function of intake pipe angle for the flow control device shown in FIG. 1.

FIG. 3 illustrates the hydraulic head H as a function of the intake pipe angle • for an embodiment of the flow control device 10 in which P is 15 inches and l=10 inches. The hydraulic head H changes inversely with changes in intake pipe angle •. Because the intake pipe angle • changes directly with changes in water depth, the hydraulic head H also changes inversely with changes in water depth. As the water depth decreases from its maximum depth to P, the hydraulic head H increases from $H_{MIN}$=7.9 inches to $H_{MAX}$=15 inches.

The intake pipe angle • is a function of water depth for the water depth greater than or equal to P:

$$D-P=(L-l)\sin •$$

and so $$H=P-l(D-P)/(L-l)$$

or $$H=P-k(D-P), k=l/(L-l)$$

The above equations can be used to calculate different embodiments of the flow control device 10 (and including different inlet orifice sizes). The change in hydraulic head H is a function of P, l, and •. The length L of the intake pipe 16 is selected to obtain the desired intake pipe angle • when the water depth is at a maximum.

Figure 4:
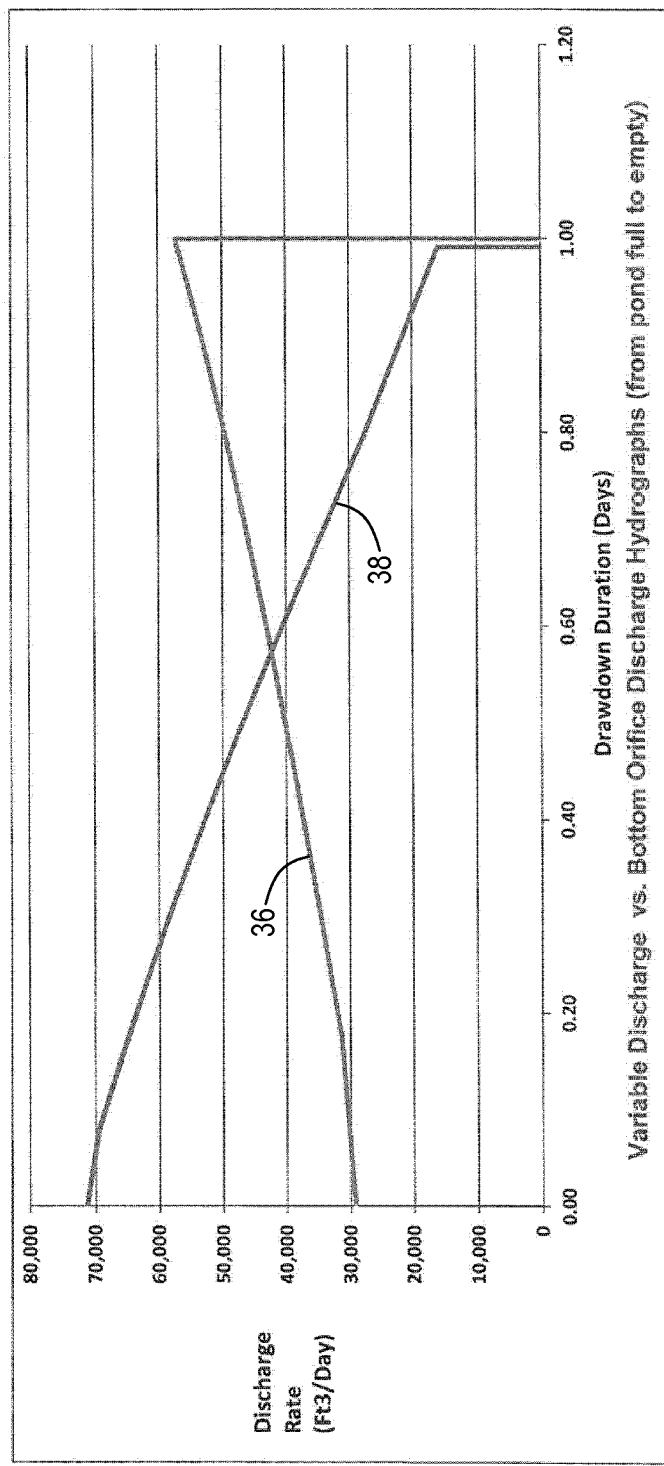
FIG. 4 illustrates discharge hydrographs for the drawdown period of a basin utilizing the flow control device shown in FIG. 1 as compared to utilizing a standard fixed orifice.

FIG. 4 is a discharge hydrograph for a rain event depicting the discharge flow from a sedimentation basin utilizing a variable-head flow control device of the type like the disclosed device 10 as compared to the discharge hydrograph for a standard fixed orifice at the bottom of the pond. Hydrograph 36 is for the type like the disclosed flow control device 10 and hydrograph 38 is the standard fixed bottom orifice.

The discharge rate of the flow control device 10 is lower than the fixed bottom orifice approximately the first half of the designed drawdown period. The difference in area between the two hydrographs 36, 38 while the hydrograph 36 is below the hydrograph 38 depicts the volume of water that is retained in the basin with the flow control device 10 as compared to the pond with the fixed bottom orifice. The water that is retained by the use of the flow control device 10 during the initial portion of the rain event that would have been discharged from the fixed bottom orifice no longer adds to the problems associated with large downstream waterway flows during the initial portion of the storm event drainage cycle.

After about the midpoint in the drawdown period, the hydrograph 36 is above the hydrograph 38, that is, the flow control device 10 is discharging more water than the fixed bottom orifice. This increased discharge rate of the flow control device 10, however, occurs at a time when all of the conventional sources of downstream water have peaked and are on the decline. Therefore the flow control device 10 helps even out the flow of downstream stormwater and protects the downstream waterways from the peak flows that are so harmful in terms of flooding and streambank and bottom erosion.

The illustrated flow control device 10 is designed to release the same volume of water from the sedimentation basin over the same period of time as the fixed bottom orifice. Because the flow control device 10 acts to delay the maximum discharge of water from the basin, a volume of water is retained on average for a longer period of time in the settlement pond as compared to the pond the fixed bottom orifice. This enables more solids to settle to the bottom of the pond using the flow control device 10 as compared to the fixed bottom orifice. The water discharged from the sedimentation pond with the flow control device 10 has higher water quality than the water discharged from the pond with the fixed bottom orifice.

In addition, since the water level for a basin with the flow control device 10 drops more slowly in the approximately first half of the drawdown period, the hydraulic head on the bottom of the basin is greater on average through the whole drawdown cycle utilizing the device 10 as compared to a fixed bottom orifice. Furthermore, the sidewalls of the basin will remain underwater for a longer period of time utilizing the device 10 as compared to a fixed bottom orifice. Greater hydraulic head on the bottom surface of the basin and a larger average area of exposed basin sidewalls combines for an additional benefit—a larger quantity of water will infiltrate into the soil rather than being discharged into downstream waterways.

Figure 5:
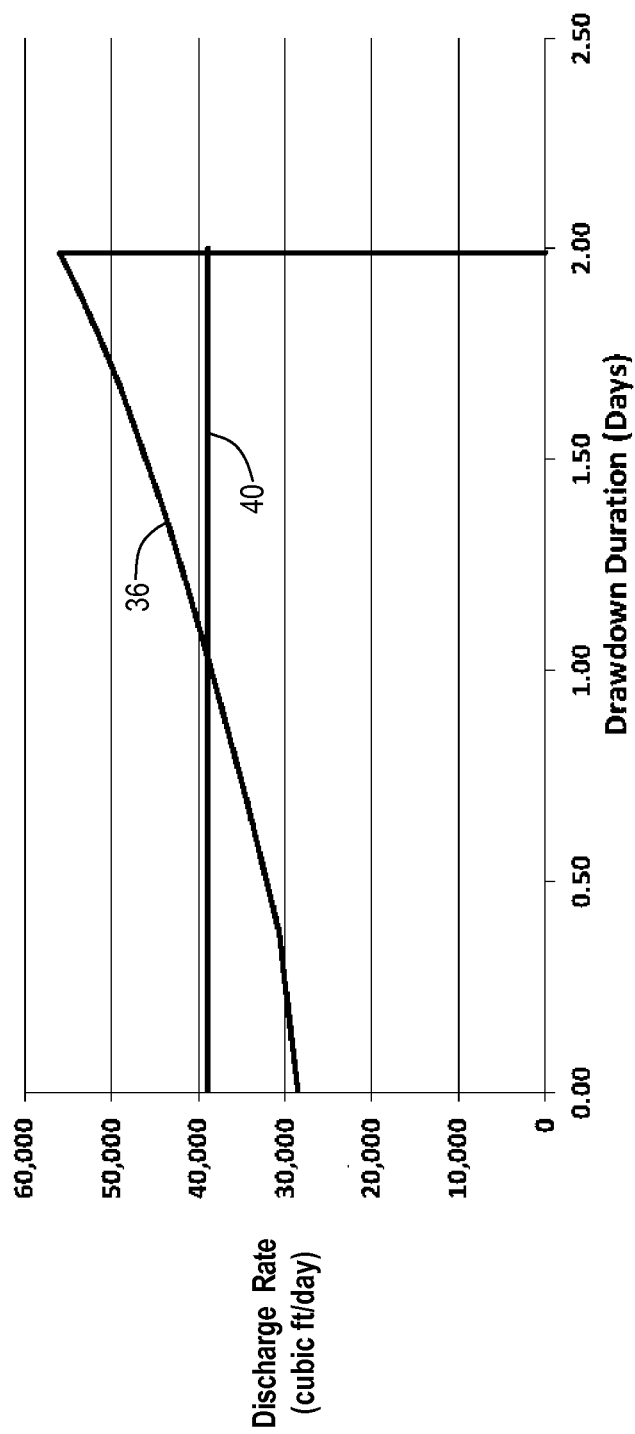
FIG. 5 illustrates discharge hydrographs for the drawdown period of a basin utilizing the flow control device shown in FIG. 1 as compared to utilizing a flow control device having a fixed inlet orifice depth.
Figure 6:
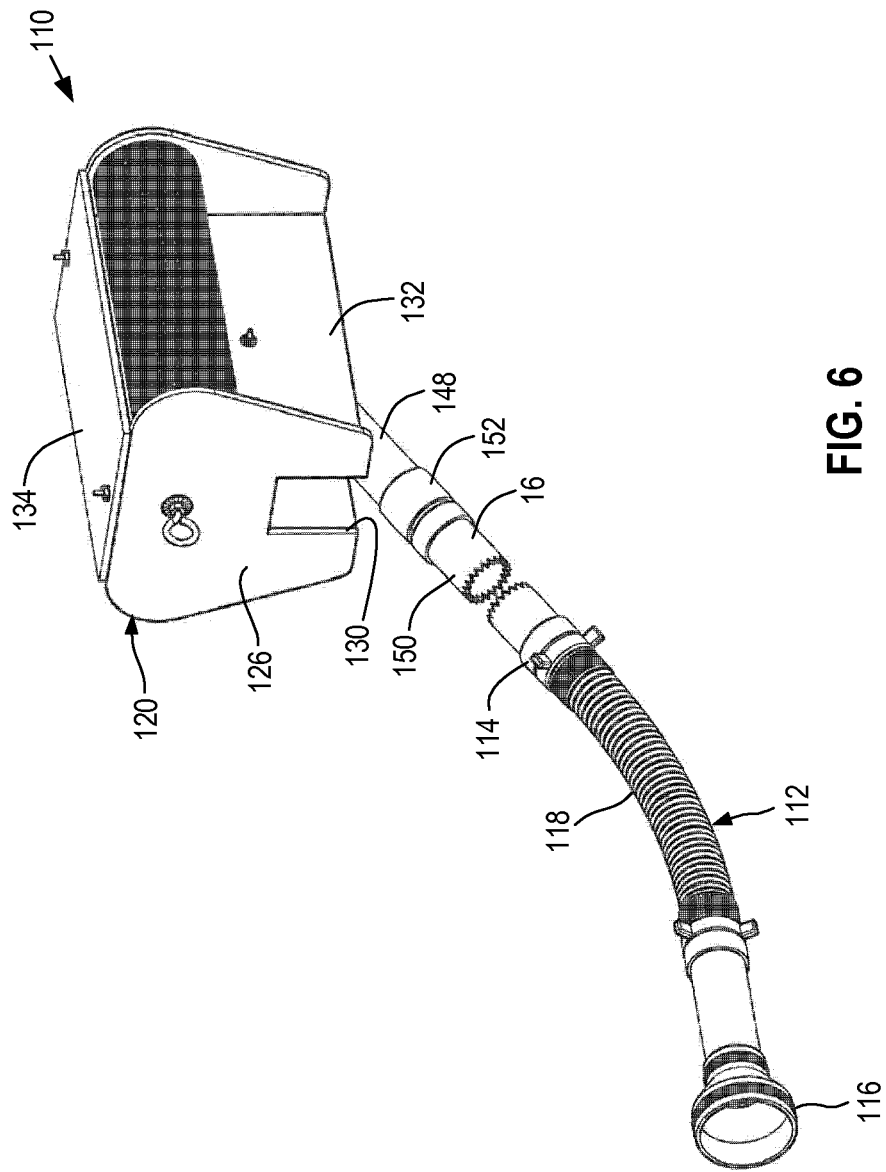
FIG. 6 is a perspective view of a second flow control device.

FIG. 5 is similar to FIG. 4 but compares the discharge hydrograph 36 of the flow control device 10 with a discharge hydrograph 40 of a an outlet with a fixed orifice depth (and thus a fixed discharge rate) for a second sedimentation basin.

The discharge rate of the flow control device 10 is lower than the fixed orifice depth outlet for again approximately the first half of the designed drawdown period, the difference in area between the two hydrographs 36, 40 while the hydrograph 36 is below the hydrograph 40 depicting volume of water that is retained in the basin that would have otherwise been discharged by the fixed orifice depth outlet. The flow control device 10 offers the same advantages of delayed discharge and higher water quality of the discharged water over the fixed orifice depth outlet as it does over the fixed bottom orifice.

FIGS. 6-9 illustrate a flow control device 110 similar to the flow control device 10 for carrying out the disclosed method. Like the flow control device 10, the illustrated flow control device 110 is designed to operate between a minimum and maximum intake pipe angle • of 0 degrees and 45 degrees respectively. In the drawings the same reference numbers will identify features of the flow control device 110 that correspond to the features of the flow control device 10.

The pivot connection 20 is formed as a flexible pipe assembly 112 that enables the inlet pipe 16 to pivot or angularly displace with respect to the outlet pipe. The flexible pipe assembly 112 includes a coupler 114 at one end of the assembly 112, an adaptor 116 at the other end of the assembly 112, and a flexible fluid line 118 extending between the coupler 114 and the adaptor 116.

The illustrated adaptor 116 is a flexible coupling for coupling the hose assembly 112 to the intake end of an outlet pipe such as the outlet pipe 12. The illustrated flexible fluid line 118 is a length of flexible hose.

The mounting structure 31 includes a float body 120 that is pivotally connected to the intake pipe 16 by a hanger assembly 122.

Figure 9:
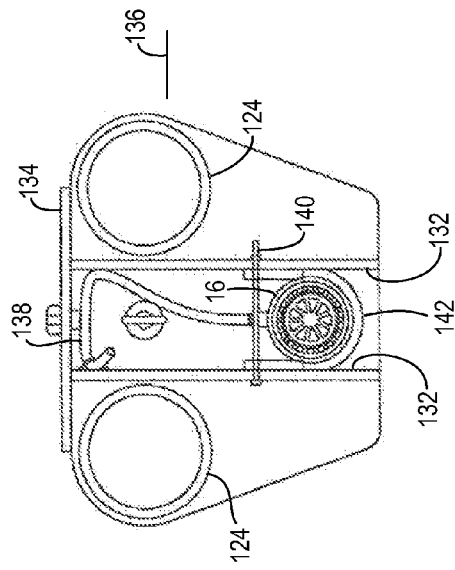
FIGS. 7-9 are front, top, and side views of the flow control device shown in FIG. 6.
Figure 7:
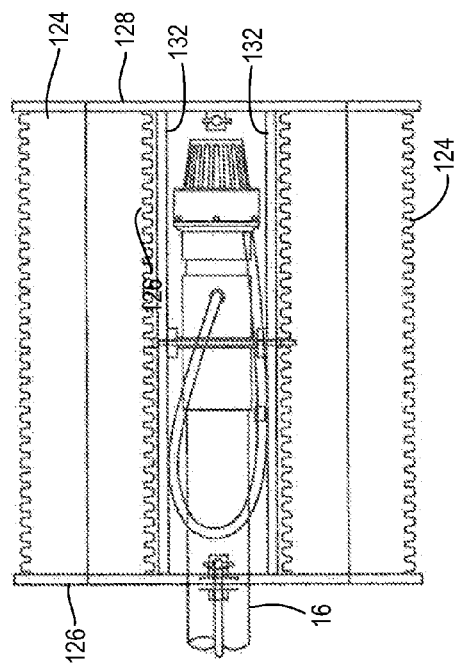
Figure 8:
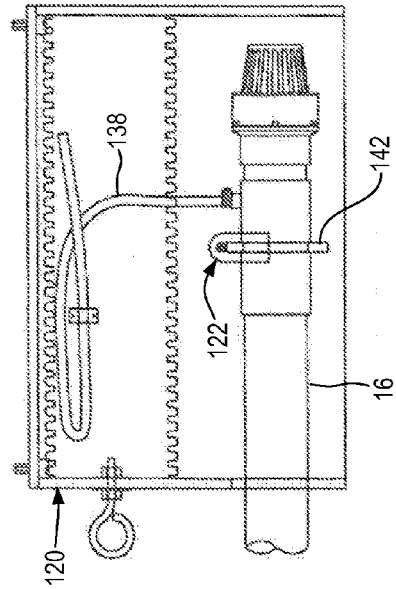

The float body 120 includes a pair of like side-by-side elongated pontoons 124 filled with marine grade foam. The ends of the pontoons 124 are connected together by a pair of end plates 126, 128 formed from plate or sheet material. Each end plate 126, 128 has a clearance opening 130 that provides clearance for the intake pipe 16 to pivot to the horizontal position. A pair of parallel ribs 132 extends between the end plates 126, 128 and between the pontoons 124. The inlet pipe 16 is closely received between the ribs 132 as best seen in FIG. 9. A lid 134 covers the upper ends of the end plates 126, 128 and the ribs 132.

When the flow control device 110 is in use, the float body 120 floats in the water along a waterline 136 with respect to the float body. The waterline 136 defines a horizontal plane through the float body 120 (that is, the waterline 136 is even with the waterline 14 when the flow control device 110 is floating in the water). A vent tube 138 attached to the float body 120 has a lower end fluidly connected to the intake pipe 16 and an open upper end located above the waterline 136 to prevent the intake pipe 16 from becoming air locked.

The hanger assembly 122 includes a rigid elongated member formed as a hanger bolt 140 that is supported by the ribs 132 and is perpendicular to the pipe axis of the intake pipe 16. Pivotally mounted to the hanger bolt 140 is a "U"-shaped yoke 142 that receives and supports the intake pipe 16. The hanger bolt 140 connects the hanger assembly 122 to the float body 120 while the yoke 142 connects the hanger assembly 122 to the intake pipe 16.

Figure 10:
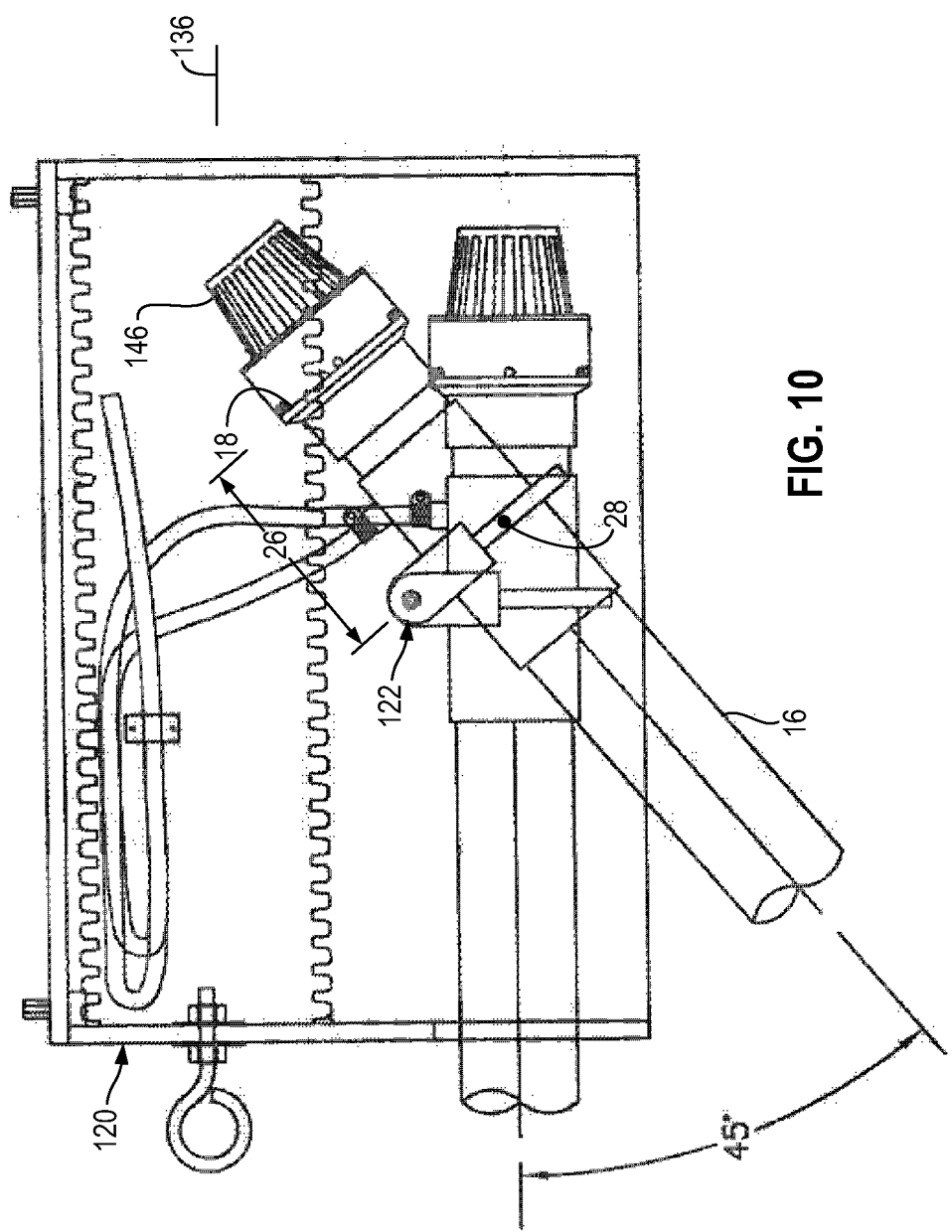
FIG. 10 is an enlarged view of FIG. 9 illustrating movement of the inlet orifice relative to the waterline.

The hanger bolt 140 and the yoke 142 are positioned to define the distance l (represented by the line dimension 26 in FIG. 10) and support the intake pipe reference point 28 located the distance 26 from the inlet orifice 18 (see FIG. 10). The hanger bolt 140 and the yoke 142 are also spaced below the waterline 136 the distance necessary to locate the reference point 28 the distance P below the waterline 136, and to allow for the designed $H_{MAX}$ at θ=0 degrees and $H_{MIN}$ at θ=45 degrees.

FIG. 10 is similar to FIG. 2 and illustrates the relative positioning of the intake pipe 16 and the float body 120 when the intake pipe angle • is 0 degrees and when the intake pipe angle • is 45 degrees. The hanger assembly 122 enables the intake pipe 16 to pivot relative to the float body 120 so that the inlet orifice 18 can move towards and away from the float body waterline 136. The hanger assembly 122 also maintains the point 28 at essentially a constant depth P below the waterline 136 throughout the intake pipe's range of pivotal motion (any vertical displacement of the point 28 caused by pivoting movement of the intake pipe 16 is insignificant in affecting performance of the flow control device 110 and so the point 28 is considered fixed at a constant depth P below the waterline for all angular positions of the intake pipe 16).

Figure 11:
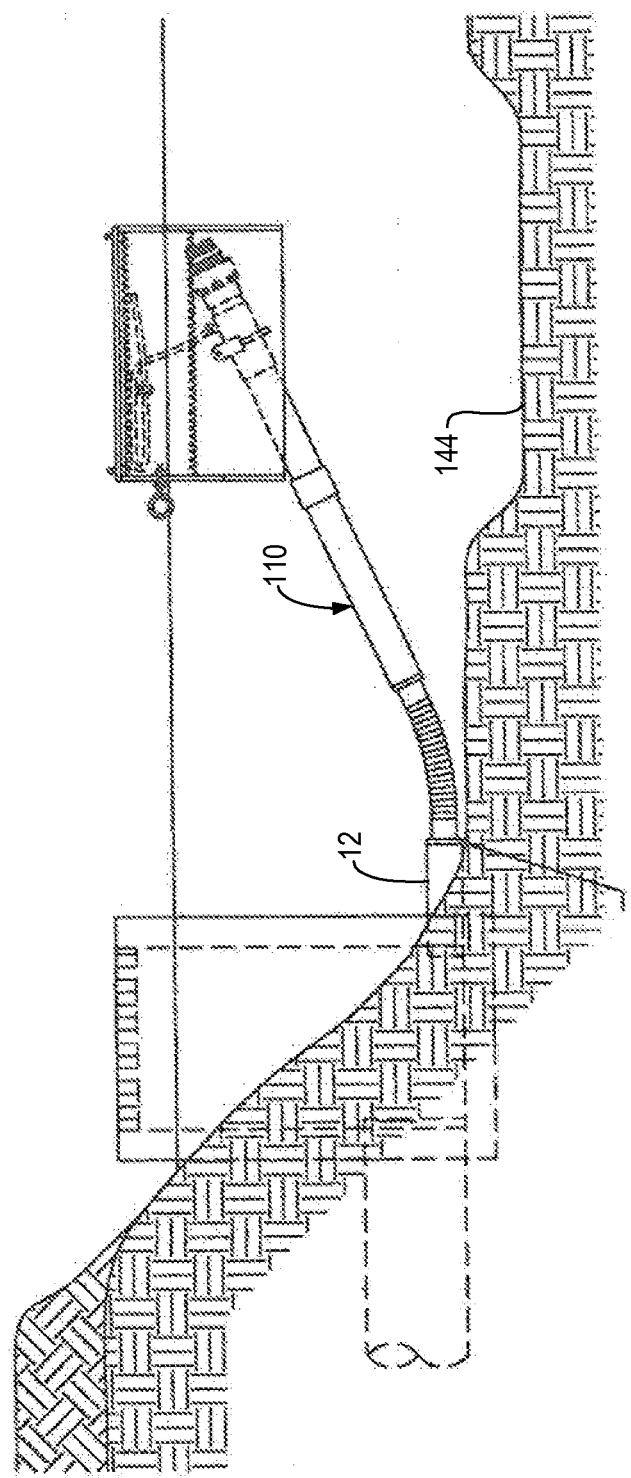
FIG. 11 is an elevation sectional view of a sedimentation pond in which the flow control device shown in FIG. 6 regulates the discharge of water from the pond.

FIG. 11 illustrates the flow control device 110 in use in a sedimentation basin having a horizontal outlet pipe 12 disposed at the bottom of the basin. FIG. 11 shows the sedimentation basin nearly full.

As can be seen in FIG. 10, the end plates and ribs of the float body 120 extend below the intake pipe 16 when the intake pipe is horizontal, the end plates and ribs forming a skirt that protects the intake pipe 16 from damage from water-borne debris and helps resist clogging of the intake pipe 16. A depression 144 is formed in the bottom of the basin to receive the skirt and enable the intake pipe 16 to reach the horizontal position.

To further resist clogging, the inlet orifice 18 is optionally covered by a cover having intake openings. The illustrated inlet orifice 18 is shown with a cover formed as a grate or strainer 146 (see FIG. 10).

The illustrated flow control device 110 is shown connected to a horizontal outlet pipe 12 located essentially at the bottom of the basin. In other embodiments the device 10 or device 110 can be used with a horizontal outlet pipe spaced above the bottom of the basin (for a "wet" basin). A raised pad or support structure may extend from the bottom of the basin to support the float body 120 when the basin waterline reaches the outlet pipe. The pad prevents further displacement of the float body 120 if the basin water level drops even further due to evaporation or basin maintenance.

In yet other embodiments of the device 10 or device 110, the device can be connected to a vertical outlet pipe (or an outlet pipe having a vertical component).

The intake pipe 16 of the flow control device 110 is formed from three sections: an upper pipe section 148 that is designed to be received in the yoke 142, a lower pipe section 150 that connects to the coupler 114, and a coupler 152 coupling the pipe sections 148, 150. This construction enables the upper pipe section 148 to be a standard length for a number of different flow control devices 110, and the length of the lower pipe section 150 varying as needed to form an intake pipe 16 having the desired design length L.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. A flow control device for use in a stormwater storage area that accumulates water during a storm event and drains the accumulated water from the storage area through an outlet pipe, the flow control device to delay the maximum rate of discharge of water from the storage area until after the water in the storage area falls from a first water depth to a second, lower water depth, the flow control device comprising:

an intake pipe extending along a pipe axis and having axially opposite first and second ends spaced apart by a length of the pipe, a first portion of the intake pipe disposed at the first end and having an opening configured to flow the water into the intake pipe when the intake pipe is immersed in the water;

a float body having a waterline that defines a horizontal plane through the float body, the float body configured to float on the water in the stormwater storage area at the waterline, the float body comprising a lower end spaced in a downward direction from the waterline, the lower end immersed in the water below the waterline when the float body is floating on the water; and a rigid hanger connected to the float body and to the intake pipe whereby the intake pipe is connected to the float body, the hanger comprising a first end portion and an opposite second end portion, the first end portion being disposed between the lower end of the float body and the waterline and fixedly connected to an intermediate portion of the intake pipe spaced along the pipe axis away from the intake pipe opening towards the second end of the intake pipe and with the first portion of the intake pipe extending away from the hanger to the first end of the intake pipe, the second end portion being disposed above the lower end of the float body and pivotally attached to the float body and pivotable with respect to the float body about a pivot axis spaced away from the first end portion of the hanger in a direction transverse to the pivot axis, the pivot axis being spaced from the intake pipe opening by a distance along the pipe axis from the intake pipe opening towards the second end of the pipe, the hanger pivotable with respect to the float body in a plane transverse to the pivot axis through a range of motion having a lowered position wherein the pipe axis is inclined with respect to the waterline at a first angle and a raised position wherein the pipe axis is inclined with respect to the waterline at a second angle greater than the first angle, the intake pipe opening being closer to the waterline when the intake pipe is in the raised position and the intake pipe opening being farther from the waterline when the intake pipe is in the lowered position, so that the intake pipe opening is movable towards and away from the waterline with pivotal movement of the hanger with respect to the float body.

2. The flow control device of claim 1 wherein the hanger is a "U"-shaped yoke, the intake pipe held in the yoke.

3. The flow control device of claim 1 wherein the second end of the intake pipe is attached to a flexible fluid line having a first end attached to the second end of the intake pipe and an opposite second end, the flexible fluid line permitting angular displacement of the intake pipe relative to the second end of the flexible fluid line.

4. The flow control device of claim 3 wherein the flexible fluid line comprises a flexible hose.

5. The flow control device of claim 1 wherein the pivot axis is spaced away from the intake pipe in a direction perpendicular to the pipe axis.

6. The flow control device of claim 1 wherein the first end portion of the intake pipe has an outer diameter and a difference in distance of the inlet pipe opening from the waterline between the raised and the lowered positions of the inlet pipe is at least equal to the outer diameter.

7. The flow control device of claim 1 in which the intake pipe has an angular displacement relative to the float body about the pivot axis of at least 45 degrees when moving from the raised position to the lowered position.

8. The flow control device of claim 1 wherein the intake pipe opening is at the first end of the intake pipe and is formed as an open end of the pipe.

9. The flow control device of claim 1 wherein the float body comprises a pair of spaced-apart members extending from the lower end of the float body towards the waterline, the hanger disposed between the pair of spaced-apart members.

10. The flow control device of claim 9 wherein the first portion of the intake pipe is disposed between the pair of spaced-apart members.

11. The flow control device of claim 1 wherein the first portion of the intake pipe is disposed between the lower end of the float body and the waterline throughout the range of motion of the intake pipe.

12. The flow control device of claim 11 wherein the first portion of the intake pipe is spaced from the lower end of the float body towards the waterline throughout the range of motion of the intake pipe.

13. A flow control device for use in a stormwater storage area that accumulates water during a storm event and drains the accumulated water from the stormwater storage area through an outlet pipe, the flow control device to delay the maximum rate of discharge of water from the stormwater storage area until after the water in the stormwater storage area falls from a first water depth to a second, lower water depth, the flow control device comprising:

an intake pipe extending along a pipe axis and having axially opposite first and second ends spaced apart by a length of the pipe, a first portion of the intake pipe disposed at the first end and having an opening configured to flow the water into the intake pipe when the intake pipe is immersed in the water;

a float body having a waterline that defines a horizontal plane through the float body, the float body configured to float on the water in the stormwater storage area at the waterline;

a hanger assembly connected to the float body and to the intake pipe whereby the intake pipe is connected to the float body, the hanger assembly connected to an intermediate portion of the intake pipe spaced along the pipe axis away from the intake pipe opening towards the second end of the intake pipe and with the first portion of the intake pipe extending away from the hanger assembly to the first end of the intake pipe, the hanger assembly configured to enable the intake pipe and the intake pipe opening to pivot together with respect to the float body about a common pivot axis, the pivot axis being spaced from the intake pipe opening by a distance along the pipe axis from the intake pipe opening towards the second end of the pipe, the intake pipe pivotable through a range of motion having a lowered position wherein the pipe axis is inclined with respect to the waterline at a first angle and a raised position wherein the pipe axis is inclined with respect to the waterline at a second angle greater than the first angle, the intake pipe opening being closer to the waterline when the intake pipe is in the raised position and the intake pipe opening being farther from the waterline when the intake pipe is in the lowered position, so that the intake pipe opening is movable towards and away from the waterline with pivotal movement of the intake pipe with respect to the float body; and the hanger assembly comprising a rigid elongate member attached to the float body and a "U"-shaped yoke pivotally mounted to the member for rotation about the member, the intake pipe held in the yoke.

14. The flow control device of claim 13 wherein the second end of the intake pipe is attached to a flexible fluid line having a first end attached to the second end of the intake pipe and an opposite second end, the flexible fluid line permitting angular displacement of the intake pipe relative to the second end of the flexible fluid line.

15. The flow control device of claim 14 wherein the flexible fluid line comprises a flexible hose.

16. The flow control device of claim 13 wherein the pivot axis is spaced away from the intake pipe in a direction perpendicular to the pipe axis.

17. The flow control device of claim 13 wherein the first end portion of the intake pipe has an outer diameter and a difference in distance of the inlet pipe opening from the waterline between the raised and the lowered positions of the inlet pipe is at least equal to the outer diameter.

18. The flow control device of claim 13 in which the intake pipe has an angular displacement relative to the float body about the pivot axis of at least 45 degrees when moving from the raised position to the lowered position.

19. The flow control device of claim 13 wherein the intake pipe opening is at the first end of the intake pipe and is formed as an open end of the pipe.

* * * * *